United States Patent [19]

Jürgens et al.

[11] Patent Number: 5,234,087
[45] Date of Patent: Aug. 10, 1993

[54] PRESSURE MEDIUM ACTUATED METHOD AND FRICTION CLUTCH WITH EXCLUSIVELY AXIALLY MOVABLE FRICTION DISCS

[75] Inventors: Gunter Jürgens, Stuttgart; Gerhard Wagner, Remseck, both of Fed. Rep. of Germany

[73] Assignee: Mercedes-Benz AG, Fed. Rep. of Germany

[21] Appl. No.: 811,062

[22] Filed: Dec. 20, 1991

[30] Foreign Application Priority Data

Dec. 21, 1990 [DE] Fed. Rep. of Germany ....... 4041159

[51] Int. Cl.$^5$ .................. F16D 25/063; F16D 25/14; F16H 61/28; B60K 17/08
[52] U.S. Cl. ...................... 192/3.58; 74/330; 192/83; 192/86; 192/87.13; 192/91 A
[58] Field of Search ............... 192/86, 87.11, 87.13, 192/91 A, 83, 3.58, 3.57; 74/330

[56] References Cited

U.S. PATENT DOCUMENTS

| | | | |
|---|---|---|---|
| 3,547,233 | 12/1970 | Girvan | 192/83 X |
| 3,946,837 | 3/1976 | Houser | 192/83 X |
| 4,560,034 | 12/1985 | Windish et al. | 192/83 X |
| 4,573,561 | 3/1986 | Deem et al. | 192/91 A |

FOREIGN PATENT DOCUMENTS 3831005 4/1989 Germany.
2540191 3/1977 Germany.

Primary Examiner—Rodney H. Bonck
Attorney, Agent, or Firm—Evenson, McKeown, Edwards & Lenahan

[57] ABSTRACT

A pressure medium actuated friction clutch with axially movable friction discs is engaged by at least one engagement spring and by an engagement actuator, and can be disengaged by a disengagement actuator In the steady-state engaged condition, only the spring force is effective.

36 Claims, 3 Drawing Sheets

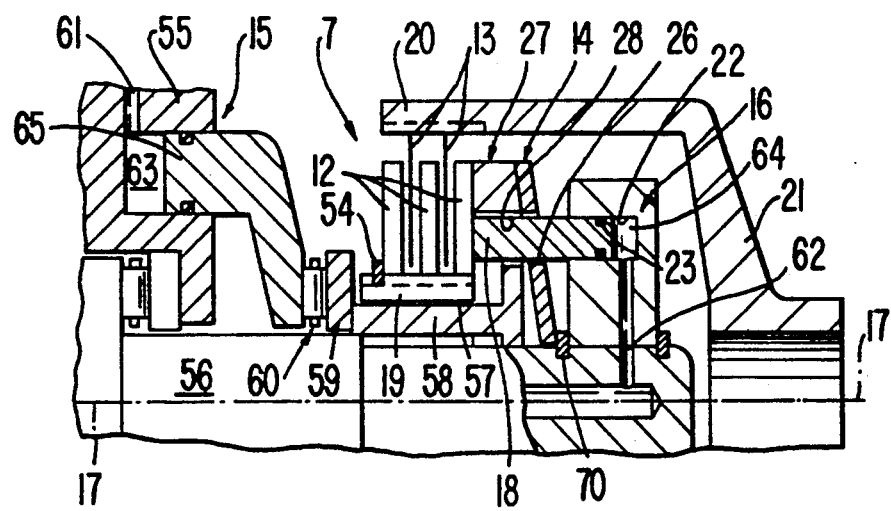

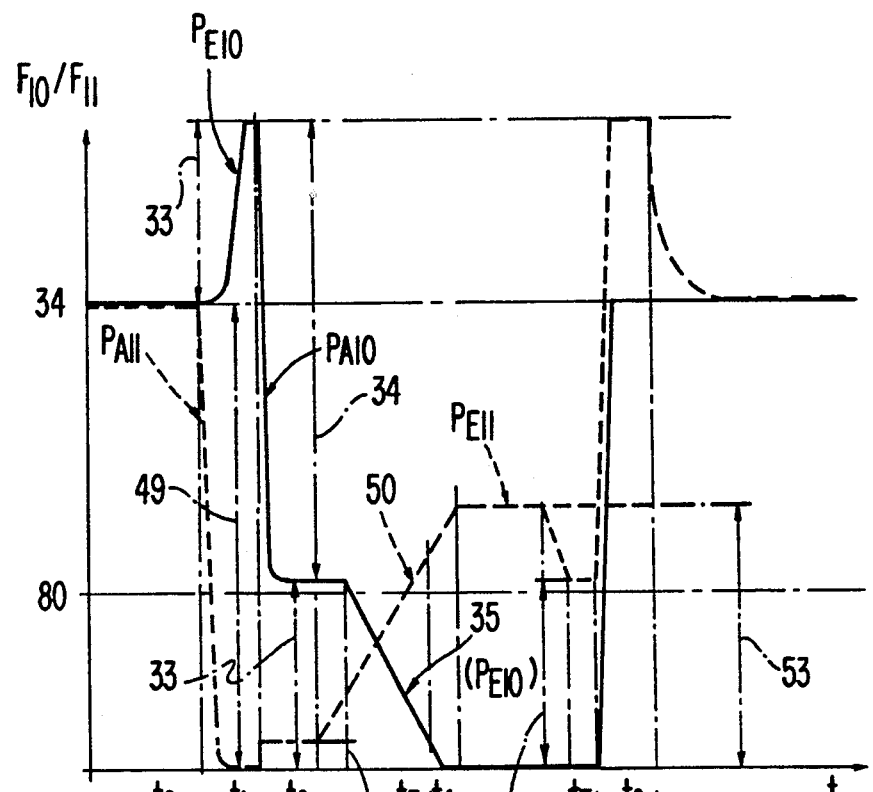
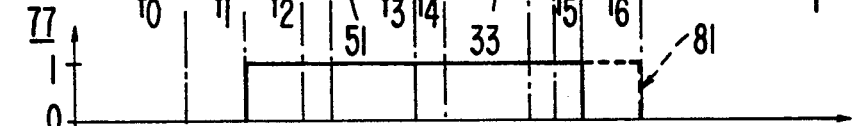
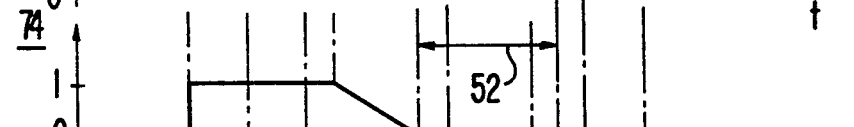
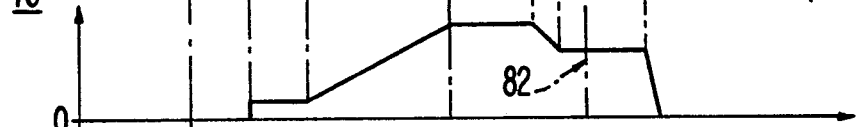
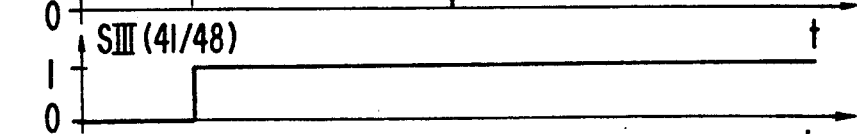

PRESSURE MEDIUM ACTUATED METHOD AND FRICTION CLUTCH WITH EXCLUSIVELY AXIALLY MOVABLE FRICTION DISCS

BACKGROUND AND SUMMARY OF THE INVENTION

The present invention relates to a friction clutch and method, and more particularly, to a pressure-medium actuated clutch with exclusively axially moving friction discs engaged by at least one engagement spring and disengaged by a pressure medium disengagement actuator of the axial piston type overcoming the engagement spring.

A friction clutch is disclosed in DE-OS 38 31 005 as located in the power transmission path between a central output shaft and a hollow countershaft, concentric with the latter, of a gearwheel change-speed gearbox. The countershaft can be driven in the gearbox by a parallel main shaft via a gearwheel stage for a medium forward gear and via a gearwheel stage for a reverse gear by a gear-change clutch interacting with the loose wheels of these gearwheel stages. The main shaft includes the fixed wheels of the gear wheel stages and is drive by a driven engine via the usual main clutch.

A pressure medium actuated plate clutch with stationary annular cylinder whose piston acts on a pressure plate via a plate spring against the force of a disengagement spring is described in DE-AS 25 40 191. This plate clutch is of a different type than a pressure-medium actuated clutch of the type disclosed in DE-OS 38 31 005 because a disengagement spring is used for disengagement, and the piston does not overcome the engagement spring during the disengagement procedure. In this known plate clutch, the annular cylinder is a double-acting cylinder. In the region between the piston and the pressure plate, a self-locking device in the form of a ball catch is provided on a hub connected to one clutch half for clutch locking (only releasable by a pressure pulse) in the engaged condition. The self-locking device consists of several interlocks arranged on a pressure ring rotationally connected to the piston. Each of these interlocks is provided with an opening in which a ball, located in a hole in the hub and subjected to the force of a spring, engages. This special construction is intended to permit, in such a known plate clutch, a bearing configuration which is intended to make high rotational speeds possible with long life. Due to the self-locking device, it is also intended that actuation should only be possible by pressure pulses via two separate pipes. In this case, it is regarded as an advantage that only one single double-acting cylinder is necessary for closing and opening the clutch.

In vehicles with manual gearboxes, the main clutch is used for separating the gearbox from the engine during the gear-changing procedure, which can only take place in the load-free condition, and as a slipping element when driving away. These main clutches are usually single-plate dry clutches which are closed by compression springs. The main clutch is opened by a stationary actuating element and the opening force acts on the rotating main clutch via a thrust bearing.

In vehicles with automatic gearboxes, friction clutches are used for changing gear under load. The friction clutches are usually wet plate clutches which are hydraulically actuated. The actuating piston rotates with the friction clutch, which is open in the unpressurized condition and is closed by the supply of pressurized oil to the actuating cylinder. The advantage of the manual gearbox main clutch is that it is closed mechanically for the main driving range. It is only opened for brief periods to change gear. The energy requirement for actuating the clutch is small. In contrast, pressure must be supplied continuously in the case of automatic gearboxes in order to keep the engaged friction clutch sufficiently well closed for the gearbox input torque to be transmitted. This requires a large amount of energy.

In existing automatic gearboxes, the required pump power amounts to about a third of the total gearbox losses. If friction clutches in automatic gearboxes were constructed in such a way that they were closed without pressure, i.e. if the torque could be transmitted by spring force, the gearbox losses could be reduced by some 20 to 25%. This would increase the gearbox efficiency by approximately 2%. The difficulty with this is that the engagement spring must be configured for the maximum torque to be transmitted which, on one hand, causes large scatter in the spring force and, on the other hand, demands a high release for every gear change, this again being subject to scatter. The effect of this is to reduce the quality of the changes under load. This is particularly significant at small engine torques where, under certain circumstances, the scatter can be much greater than the needed control magnitude.

The losses in gear-changing quality and the complex construction of the automatic gearbox as an epicyclic gearbox in which, depending on the gearbox configuration, several friction clutches and/or friction brakes are always opened and others closed, have previously led to friction clutches in automatic gearboxes being constructed in such a way that they are open in the unpressurized condition. In twin clutch gearboxes (i.e., two-path gearwheel change-speed gearboxes of the countershaft type) which do not require any brakes for gear changing under load but only require two friction clutches which transfer the power alternately, both friction clutches can also be constructed in an arrangement in which they are closed when unpressurized. The engine torque is transmitted to the driven shaft via the power-transmitting gearbox branch by the closed friction clutch and the synchronization of the gear selected. The free gearbox branch also rotates at engine speed with the second friction clutch closed but is separated from the driven shaft by the open synchronization systems.

An object of the present invention is to provide a clutch arrangement, preferably for a twin-clutch gearbox, which is mechanically closed for the main driving ranges, i.e. requires little pump power, and which simultaneously ensures a gear-changing quality which is comparable with that of present-day epicyclic gearboxes.

In a friction clutch in which friction discs are engaged by at least one engagement spring and disengageable via a pressure medium disengagement actuator of the axial piston type, the foregoing object has been achieved advantageously in accordance with the present invention by providing a pressure medium actuator of the axial piston type, and the engagement spring of the friction discs can also be disconnected by the disengagement actuator when the friction discs are actuated in the engagement direction by the engagement actuator.

In the present invention, a friction clutch mechanically to reduce the power loss is closed by an engagement spring. The friction clutch is disengaged by a disengagement actuator which can rotate with the friction clutch and is supplied with pressurized oil via a hydraulic rotating joint or which is attached to a stationary casing part. The disengagement force is transmitted to the engagement spring via a thrust bearing.

The necessary gear-changing quality is achieved by an engagement actuator which acts on the friction clutch and closes the clutch when subjected to pressure. The engagement actuator can also rotate with the friction clutch or be attached to a fixed location and the engagement force can be transmitted to the friction clutch via a thrust bearing. In order to avoid centrifugal force effects on the pressurized oil, the engagement actuator can be advantageously configured to be stationary.

Control measures for an individual friction clutch, namely disengagement and engagement procedures, are other advantageous features of the present invention. Gear changing with control of the two friction clutches in a twin clutch gearbox can take place such that the friction clutches are closed by spring force during steady-state operation. This spring force corresponds to the maximum transmittable clutch torque.

When the gear-changing procedure is initiated, the disengagement actuator of the free friction clutch of the following gear is first subjected to pressure so that the next gear can be synchronized. The engagement actuator on the power-transmitting friction clutch is then subjected to a pressure which corresponds to the instantaneous clutch load. The disengagement actuator is then subjected to maximum pressure so that the engagement spring is compressed.

It is not necessary to control the pressure in the disengagement actuator. It must always be higher than that needed to compress the engagement spring. After load is removed from the engagement spring, the engagement actuator takes over the torque transmission. The rest of the gear-changing procedure corresponds to that of conventional automatic gearboxes. After the end of the gear-changing procedure, the operating pressure on both disengagement actuators is switched off and the engagement spring takes over the torque transmission. The engagement actuator pressure can therefore also be switched off so that the entire gear-changing element is unpressurized in steady-state operation.

The friction clutch according to the present invention can be either a dry or a wet clutch. The disengagement actuator can, for example, be fed from a pressure reservoir. Because the friction clutches are closed during steady-state operation, the clutch control can be structured such that both actuators always remain full. This makes the conventional usual filling phase unnecessary and shortens the gear-changing time. The control is advantageously structured such that the engagement actuator is switched on simultaneously with the synchronization of the next gear. This reduces the gear-changing time. The pressure piece of the disengagement actuator can contain the operating piston of the engagement actuator. A corresponding method of the present invention is matched to the above-mentioned control measures for a twin-path gearwheel change-speed gearbox with two friction clutches.

BRIEF DESCRIPTION OF THE DRAWINGS

These and further objects, features and advantages of the present invention will become more apparent from the following detailed description of several currently preferred embodiments of a friction clutch according to the present invention and of a method for controlling two friction clutches according to the invention, which clutches are used in a twin-path gearwheel change-speed gearbox for changing gear under load, when taken in conjunction with the accompanying drawings wherein:

FIG. 1 is a cross-sectional, partial view of a first embodiment of a friction clutch according to the present invention example in diagrammatic representation taken along an axial section containing the clutch centerline;

FIG. 2 is a cross-sectional view similar to FIG. 1 but showing a friction clutch according to a second embodiment of the present invention;

FIG. 3 is a cross-sectional view similar to FIG. 1 but showing a friction clutch according to a third embodiment of the present invention;

FIGS. 6a, 6b, 6c, 6d, 6e, 6f, and 6g are diagrams explaining, in association with the block circuit diagram of FIG. 4, gear changing to a higher gear in the gearbox of FIG. 5.

DETAILED DESCRIPTION OF THE DRAWINGS

Figure 4:
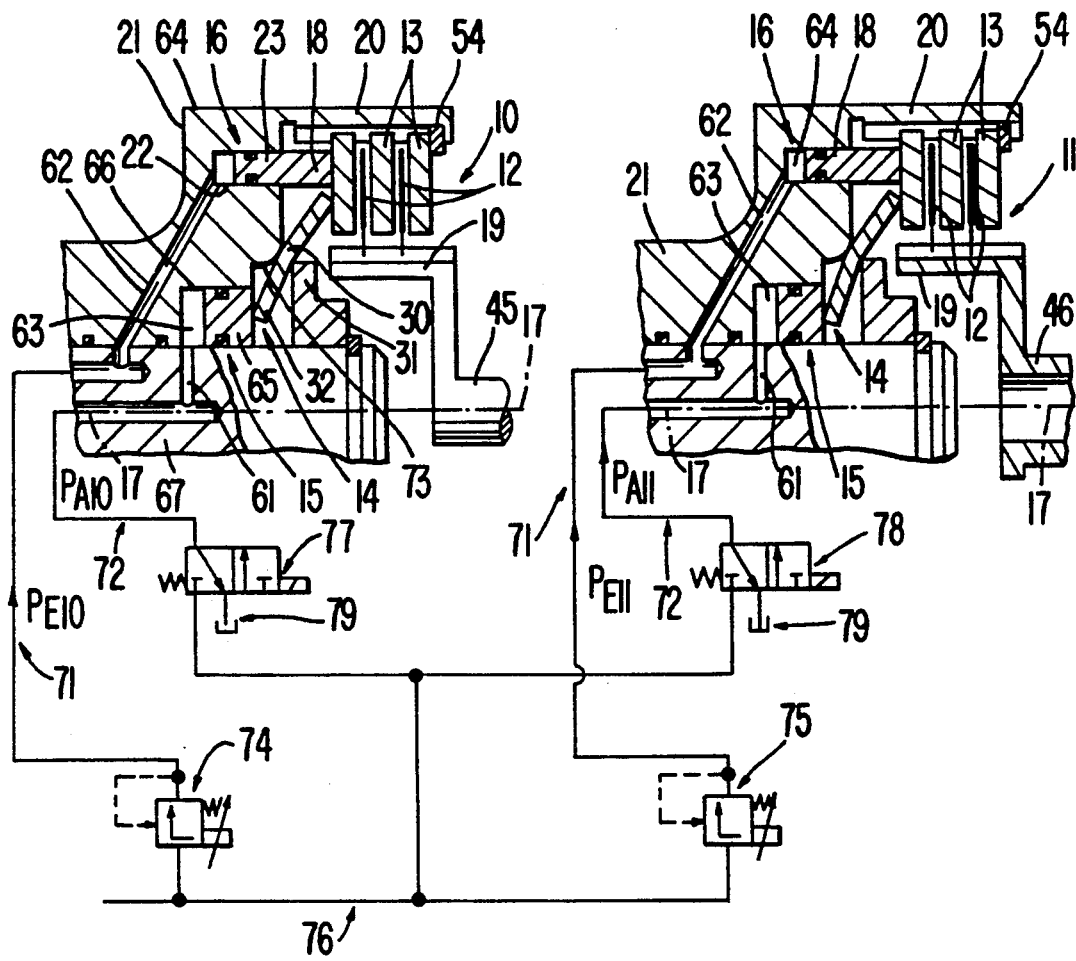
FIG. 4 is a block circuit diagram for a control system of two friction clutches according to a fourth embodiment of the present invention and used for the gear changes under load in a twin-path gearwheel change-speed gearbox.

The embodiments of the friction clutch according to the present invention and designated generally by the numerals 7, 8, 9, 10, and 11 in FIGS. 1-4 respectively, have the following common configuration wherein the parts are designated by the same reference numerals. A clutch housing 21 is centered on the clutch centerline 17-17 and is rotatably supported. The housing 21 is solidly or integrally connected to one clutch half in the form of an outer plate carrier 20 on which friction discs 13 are held. The friction discs 13 are configured as outer plates held so that they are rotatably fixed and axially movable on the plate carrier 20. A clutch half is supported centrally and rotatably relative to the clutch centerline 17—17, and is configured as an inner plate carrier 19, which carries friction discs in the form of inner plates 12 so that they are rotatably fixed and axially movable thereon. The inner plates 12 can be brought into frictional contact with the outer plates 13 in a known manner.

Each of the friction disc or plate groups 12, 13 can be actuated for engagement both by an engagement spring 14 configured as a plate spring, and by a pressure medium engagement actuator designated generally by the numeral 16 of the axial piston type. A circlip inserted in a peripheral groove of a plate carrier 19 or 20 is used as an abutment 54. Relative to the direction of the clutch centerline 17—17, the engagement spring 14 and the engagement actuator 16 are jointly arranged on the same side of the friction disc group 12, 13. This friction disc group can be disengaged by a pressure medium disengagement actuator 15 of axial piston type which acts against the particular engagement spring 14. The engagement actuator 16 operates on the friction disc group 12, 13 via a pressure piece 18 which is structurally independent of the engagement spring 14.

In the embodiments of FIGS. 1 to 3, on one hand, the engagement spring 14 and the disengagement actuator 16 operate on the friction disc group 12, 13 by way of a common pressure piece 27. In the embodiments of FIG. 4, on the other hand, the disengagement actuator 15 operates directly on the engagement spring 14 through an intermediary abutment 31 which supports the engagement spring 14.

Now with reference to the specific embodiment shown in FIG. 1, a shaft 56 is supported in a non-rotating housing 55 so as to be rotatable but substantially immovable in the axial direction. In its central region, the shaft 56 holds the inner plate carrier 19 with the inner plates 12 and the abutment 54. On the side of the friction disc group containing the friction discs 12, and 13, and opposite the housing 55, the annular pressure piece 27 is located so as to be axially movable relative to the shaft 56. The pressure piece 27 is pressed for engagement against the friction disc group 12, 13 by the spring force of the engagement spring 14 which, in this embodiment, is supported on an abutment 70 formed by a circlip. The pressure piece 27 and the engagement spring 14 have aligned openings 26, 28 to permit the passage of a pin-shaped pressure piece 18 which is connected to or formed integrally with the axial piston 23 of the engagement actuator 16. Thus, the housing of the engagement actuator 16 with the cylindrical aperture 22 for the axial piston 23 is firmly located on the shaft 56 on the side of the engagement spring 14 opposite the pressure piece 27.

The inner plate carrier 19 has axial passages 57, each provided for an axial finger-type extension 58 of the pressure piece 27. A pressure ring 59 is arranged on the section of the shaft 56 located between the housing 55 and the inner plate carrier 19 so that it can rotate and move axially relative to the shaft 56. This pressure ring 59 is in contact with the extensions 58 by means of one of its end surfaces or faces and interacts, by means of its other end surface or face, with the disengagement actuator 15 via a thrust rolling contact bearing 60 such that, when pressure is applied, the common pressure piece 27 disconnects the spring force of the engagement spring 14 from the friction disc group 12, 13. Pressure is applied to the two actuators 15, 16 by housing connections 61, 62, respectively, which emerge in the appropriate operating pressure chambers 63, 64, respectively, to apply pressure to the respective operating pistons 65, 23, and to act as connections for the operating pressure medium pipe.

The friction clutch 7 is held in the engaged condition by the engagement spring 14, with the actuators 15, 16 being unpressurized and the spring force being sized for the maximum clutch torque. In order to permit the friction clutch 7 to be disengaged with a controlled variation of the clutch torque, the engagement actuator 16 is first subjected to operating pressure which is sufficiently high for the instantaneous load torque to be transmitted. The disengagement actuator 15 is subsequently subjected to operating pressure which is sufficiently high for the engagement spring 14 to be disconnected from the friction disc group 12, 13. It is now possible to reduce the clutch torque to zero with a specific variation by modulating the operating pressure in the operating pressure chamber 64. During the engagement procedure, it is then possible to increase the clutch torque from zero with a specific variation, using a reverse procedure, by way of the operating pressure of the engagement actuator 16 until an instantaneous load torque can be transmitted. The operating pressure of the disengagement actuator 15 is then disconnected so that the original unpressurized engagement condition is restored.

Now with specific reference to FIG. 2, an annular pressure piece 27 is centrally located relative to the clutch centerline 17—17 and is arranged so that it can be displaced axially within the clutch housing 21 with the outer plate carrier 20. This pressure piece 27 is located between, on one hand, the friction disc group 12, 13, and on the other hand, the engagement spring 14, and has a cylindrical hole 22 for the axial piston 23 of the engagement actuator 16 and an aligned hole 29 for the passage of the pressure piece 18 connected to the axial piston 23. The engagement spring 14, whose radially outer region is supported on the clutch housing 21 and whose radially inner region is supported on the pressure piece 27, actuates the friction disc group 12, 13 in this manner in the engagement sense via the pressure piece 27. The abutment 54 for the friction disc group 12, 13 is seated in this embodiment on the outer plate carrier 20.

The disengagement actuator 15 in the embodiment of FIG. 4 is configured such that its axial piston 65 is solidly connected to or integral with the pressure piece 27 and its housing 66 is designed to be solidly connected to or integral with a shaft 67 which is, in turn, located concentrically with the clutch centerline 17—17 and is solidly or integrally connected to the clutch housing 21. Pressure ducts 68, 69 are provided in the shaft 67, and these ducts communicate with the respective housing connections 61, 62 of the actuators 15, 16.

Whereas, in the embodiment of FIG. 1, the reaction pressure force of the engagement actuator 16 is fed directly into the housing with the cylindrical hole 22 and is firmly connected to the shaft 56, the housing directly accepting the reaction pressure force of the engagement actuator 16 in the FIG. 2 embodiment, i.e. the pressure piece 27, is supported by the engagement spring 14 on the clutch housing 21 accepting the reaction pressure forces as such. The control of the FIG. 2 embodiment can take place in the same way as that of the FIG. 1 embodiment.

Now with respect to the specific embodiment of FIG. 3, both the disengagement actuator 15 and the engagement actuator 16 are respectively located on a non-rotating housing part 55, 24, and the respective associated axial piston 65, 23 operates via respective thrust bearings 60, 25 on the associated pressure piece 27, 18.

A circlip abutment 70 supporting the engagement spring 14, the engagement spring 14 itself and the abutment 54 of the friction disc group 12, 13 are located on the shaft 56 which is firmly connected to the inner plate carrier 19. In this arrangement, the engagement spring 14 and the pressure piece 27 have aligned openings 26, 28 for the passage of each pin-shaped pressure piece 18 which is operated by the engagement actuator 16 via the associated thrust bearing 25. Housing connections 61, 62, which emerge into the respective associated operating pressure chambers 63, 64 are again provided for applying pressure to the actuators 15, 16. The control of the FIG. 3 embodiment takes place in the same manner as that of the FIG. 1 embodiment described above.

In the embodiments shown in FIG. 4, as with the embodiment of FIG. 2, all the clutch actuation mechanisms are located on the same side relative to the directions of the clutch centerline 17—17 of the friction disc group 12, 13 and in a clutch housing 21 solidly connected to the outer plate carrier 20 so that the abutment 54 of the friction disc group 12, 13 is also seated on the outer plate carrier 20. Holes 22, 66 for the axial pistons 23, 65 of the actuators 16, 15 are provided on the clutch housing 21, with the shaft 67 solidly connected thereto. Each hole is connected to a respective operating pressure pipe 71, 72, by the associated housing connections 62, 61.

The distance between the cylindrical hole 22 and the clutch centerline 17—17 is greater than the external radius of the engagement spring 14 so that the associated pressure piece 18 is located radially outside the engagement spring 14. The radially outer region of the engagement spring 14 is supported on the friction disc group 12, 13 and its radially inner region is supported on the pressure piece of the axial piston 65 of the disengagement actuator 15. The piston and the friction discs are located on different sides of the spring. Two abutments 31, 73 solidly connected to the clutch housing 21 are located on different sides of the engagement spring 14 and each in a central region of the engagement spring 14.

In the unpressurized condition of the disengagement actuator 15, the engagement spring 14 is supported, on one hand, on the abutment 73 located with the axial piston 65 on the same side of the spring 14 and, on the other hand, on the friction plate group 12, 13. When pressure is applied to the disengagement actuator 15, the engagement spring 14 is then supported, on one hand, on the axial piston 65, or on the pressure piece connected thereto, and, on the other hand, on the abutment 31 located, with the friction disc group, on the same side of the spring 14. As an individual clutch, the embodiment 10 or 11 can be controlled in the same manner as that of the FIG. 1 embodiment.

The essential features of the friction clutch 11 in FIG. 4 can be similarly configured relative to the friction clutch 10 in FIG. 4 so that a separate detailed description of the clutch 11 is unnecessary. The pressure medium pipe 71 of each of the engagement actuators 16 of the two friction clutches 10, 11 is connected to a high-pressure pipe 76 by a respective electromagnetic pressure regulating valve 74, 75. Each of the operating pressure pipes 72 of the disengagement actuators 15 of the two friction clutches 10, 11 is connected, via an electromagnetic 3/2-way valve 77, 78, to the main pressure pipe 76 and to a substantially unpressurized pressure medium reservoir 79.

In the non-excited condition of the pressure regulating valves 74, 75, the operating pressure in the engagement actuators 16 is switched off but it is possible for the associated operating pressure chamber 64 to be filled with pressure medium. In the non-excited condition of the directional valves 77, 78, the operating pressure in the particular disengagement actuator 15 is switched off; it is still possible, however, for the relevant operating pressure chamber 63 to be filled with pressure medium.

Figure 5:
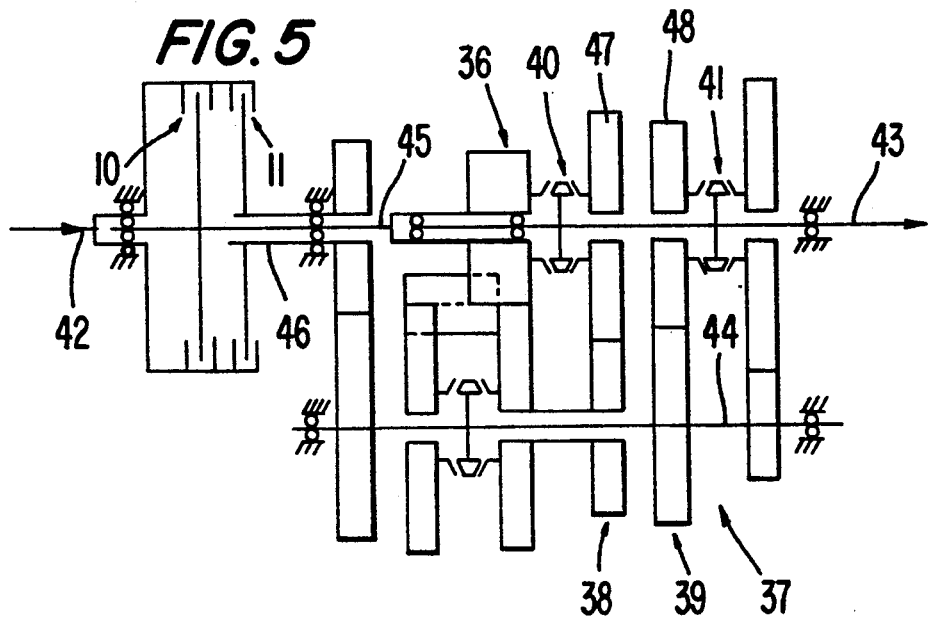
FIG. 5 is a schematic view of a gearbox diagram of a gearwheel change-speed gearbox with two friction clutches according to the invention for gear changing under load to be used with the system shown in FIG. 4.

With respect now to the twin-path gearwheel change-speed gearbox shown in FIG. 5, two gearbox sections 36 and 37 with parallel power transmission paths and having a common countershaft 44 parallel to the shafts 42 43 are located between an input shaft 42 driven by a driving engine and a coaxial output shaft 43. The gearbox section 36 can be brought into drive connection with the input shaft 42 by a central intermediate shaft 45 coaxial with the input shaft 42 via the friction clutch 10 and the gearbox section 37 can be brought into drive connection with the input shaft 42 by a hollow intermediate shaft 46 concentric with the intermediate shaft 45 via the friction clutch 11. For a higher ratio second gear, the gearbox section 36 has a gearwheel stage 38 with a loose wheel 47 which can be connected to the output shaft 43 by means of a gearwheel clutch 40. For a lower ratio third gear, the gearbox section 37 has a gearwheel stage 39 with a loose wheel 48 which can be connected to the output shaft 43 by a gearwheel clutch 41. In second gear, the friction clutches 10, 11 and the gearwheel clutch 40 for connecting the loose wheel 47 are engaged, and the gearwheel clutch 41 is disengaged. The power transmission takes place in this case from the friction clutch 10, via together the intermediate shaft 45 forming the input element of the gearbox section 36, the gearbox section 36 and the loose wheel 47 which then forms the output element of the gearbox section 36, to the output shaft 43 which is connected in conventional manner with vehicle wheels of the motor vehicle.

In third gear, the friction clutches 10 and 11 and the gearwheel clutch 41 for connecting the loose wheel 48 are engaged and the gearwheel clutch 40 is disengaged. The power transmission takes place in this gear from the friction clutch 11, via together the intermediate shaft 46 forming the input element of the gearbox section 37 to the countershaft 44, the gearwheel stage 39 to the loose wheel 48 forming the output element of the gearwheel section 37 and the gearwheel clutch 41 to the output shaft 43.

When changing between second and third gears, the friction clutch of the new gear is first disengaged and the gearwheel clutch of the new gear is engaged. The engagement actuator 16 of the friction clutch of the previous gear is subsequently or simultaneously subjected to an operating pressure which is sufficiently high for the instantaneous load torque to be transmitted. Sufficiently high operating pressure is then applied to the disengagement actuator 15 of the friction clutch of the previous gear for the associated engagement spring 14 to be disconnected from its friction disc group. Intersection control of the operating pressures of the engagement actuators 16 then takes place in a known manner.

Changing up from second gear to third gear in the twin-path gearwheel change-speed gearbox of FIG. 5 is described below using the diagrams of FIGS. 6a–6g.

The resultant actuating force F at the particular friction disc group 12, 13 is plotted against time t in the FIG. 6a diagram. The curve drawn in full line reproduces the resultant actuation force $F_{10}$ at the friction disc group 12, 13 of the friction clutch 10 of the previous, i.e. second, gear. The dotted curve indicates, on the other hand, the actuating force $F_{11}$ at the friction disc 12, 13 of the friction clutch 11 of the new, i.e. third, gear.

The switching condition of the directional valve 77 of FIG. 4 is given as a function of time t in the FIG. 6b diagram. The switching condition of the directional valve 78 of FIG. 4 is given as a function of time t in the FIG. 6c diagram. The excitation of the pressure regulating valve 74 of FIG. 4 is given as a function of time t in the FIG. 6d diagram. The excitation of the pressure regulating valve 75 of FIG. 4 is given as a function of time t in the diagram of FIG. 6e. The engagement condition of the gearwheel clutch 40 in FIG. 5, used for connecting the loose wheel 47 and initiated by a gear-change signal S$_{II}$, is given as a function of time t in the FIG. 6f diagram. Finally, the engagement condition of the gearwheel clutch 41 in FIG. 5, used for connecting the loose wheel 48 and initiated by a gear-change signal S$_{III}$, is given as a function of time t in the FIG. 6g diagram.

In steady-state operation (t<t$_0$), in which both friction clutches 10 and 11 are unpressurized with respect to their two respective actuators 15, 16 and are therefore engaged by their respective engagement spring 14 with the maximum spring force F$_{10}$=F$_{11}$=34, the gear-changing signal S$_{II}$ is present so that the gearwheel clutch 40 is engaged and the second gear is selected. The friction clutch 10 transmits the instantaneous load torque, for which a lower actuating force F$_{10}$=80 is sufficient. The initiation of the upward gear change, II-III, takes place at the time t=t$_0$. The friction clutch 11 of the third gear is released by exciting the directional valve 78 and, thereby by the disengagement actuator 15 of this clutch is subjected to operating pressure p$_{A11}$ of such a magnitude p$_{A11}$=49, a disengagement pressure value, that the spring force F$_{11}$=34 on the friction disc group 12, 13 of the friction clutch 11 becomes zero. The gear-change signal S$_{III}$ appears simultaneously so that the gearwheel clutch 41 is engaged to connect in the loose wheel 48 and the third gear is therefore quasi-preselected in the gearbox section 37 which is, during this process, free of load. The pressure regulating valve 74 is also excited at the time t=t$_0$ such that the engagement actuator 16 of the friction clutch 10 of the second gear is subjected to an operating pressure p$_{E10}$ of a magnitude p$_{E10}$=33, the load pressure value, such that the actuating force of the engagement actuator 16 is sufficient for transmitting the instantaneous load torque (33≧80).

If, at time t=t$_1$, the operating pressure P$_{E10}$ in the engagement actuator 16 of the friction clutch 10 of the second gear is brought to the necessary load pressure value 33, the directional valve 77 is excited so that the disengagement actuator 15 of the friction clutch 10 of the second gear is subjected to an operating pressure p$_{A10}$ of such a magnitude (p$_{A10}$=34, the disengagement pressure value) that the associated engagement spring 14 is disconnected from the friction disc group 12, 13 of the friction clutch 10 of the second gear and the engagement actuator 16 alone therefore supplies the necessary actuating force. The pressure regulating valve 75 is simultaneously excited to the extent that the operating pressure chamber 64 of the engagement actuator 16 of the friction clutch 11 of the third gear is filled with pressure medium.

If, at the time t=t$_2$, the filling procedure has been completed and, consequently, the operating pressure p$_{E11}$ in the engagement actuator 16 of the friction clutch 11 of the third gear climbs above the constant pressure 51 occurring during filling, an intersection control with the respective curves 35, 50 of the operating pressure p$_{E10}$ and of the operating pressure p$_{E11}$ is initiated by the pressure regulating valve 74, 75.

At the time t=t$_4$, the friction clutch 10 of the second gear, and therefore also the gearbox section 36, is free from load so that the gear-change signal S$_{II}$ is erased, and the gearwheel clutch 40 disengaged thereby because the actuating force of the engagement actuator 16 of the friction clutch 11 of the third gear has simultaneously sufficiently high (p$_{E11}$=33≧80) for the instantaneous load torque to be transmitted by this friction clutch of the new gear alone. Finally, a control phase 52 is initiated at the time t=t$_4$, during which the operating pressure p$_{E11}$ is raised to a phase pressure value 33 which is higher than the load pressure value 33 in order to retard the input shaft 42 down to the rotational speed value associated with the third gear. This increase in pressure, i.e. the control phase 52, terminates when the rotational speed value of the input shaft 42 associated with the third gear is reached at the time t=t$_5$. Consequently, the operating pressure p$_{A10}$ and p$_{A11}$ in the disengagement actuators 15 of both friction clutches 10, 11 can be switched off at the time t=t$_5$ by the directional valves 77, 78 so that the friction clutch 10 of the second ear is only actuated by its engagement spring 14. In contrast, the friction clutch 11 of the third gear is actuated in the engagement direction both by its engagement spring 11 and initially also by its engagement actuator 16. Therefore, the operating pressure p$_{E11}$ in the engagement actuator 16 of the friction clutch 11 of the third gear can also be switched off at the time t=t$_6$ by the pressure regulating valve 75 so that the steady-state condition of the third gear is reached, in which both clutches 10 and 11 are unpressurized and are engaged by spring force.

In order to simplify the control requirements when changing gear, it is generally advantageous for pressure to be applied simultaneously to the disengagement actuator 15 of the friction clutch 10 of the old, i.e. second, gear and the engagement actuator 16 of the friction clutch 11 of the new, i.e. third, gear. For the same reason, it is advantageous for pressure to be applied simultaneously to the disengagement actuator 15 of the friction clutch 11 of the new third gear and the engagement actuator 16 of the friction clutch 10 of the old second gear.

The two advantageous measures described above, where these vary from the control curve of FIG. 6a, are taken into account as respective signal changes 81, 82 shown dotted in FIG. 6b and FIG. 6e. Otherwise, they are identical to the curves in FIGS. 6a-6g.

When a friction clutch in the FIG. 2 embodiment is used, a mode of operation differing in an advantageous manner from the FIG. 6a curve occurs because of the series connection of the engagement spring 14 and the engagement actuator 16 such that the particular maximum value of the clutch actuating forces F$_{10}$ and F$_{11}$ remain limited to the maximum value 34 of the spring force of the particular engagement spring 14. This is because the pressure force of the particular engagement actuator 16 acts against the spring force in this case and is not added to the spring force of the engagement spring 14 as in FIG. 6a.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An arrangement comprising an axial piston type pressure medium engagement actuator, two friction clutches configured to be brought into engagement with the engagement actuator, each having a disengagement actuator and at least one engagement spring, and arranged in series with a gearbox section which has at least one gearwheel stage with a loose wheel which can be connected to its shaft by a gearwheel clutch and which clutches are arranged in a power transmission path between an input shaft and an output shaft of a multi-path gearwheel change-speed gearbox, such that, during a gear change between a previous gear and a new gear where, in the previous gear, a first gearbox section is connected by engagement of both one of its gearwheel clutches and an associated friction clutch and, in the new gear, a second gearbox section is connected in a corresponding manner into a drive connection between the input shaft and the output shaft, and means for providing a gear-change signal, wherein, on the appearance of gear-change signal, the disengagement actuator of the friction clutch of the new gear is subjected to operating pressure at least up to the level of a disengagement pressure value sufficient to overcome the at least one engagement spring.

2. The arrangement according to claim 1, wherein, on or after reaching the disengagement pressure value, the gearwheel clutch of the loose wheel of the gearwheel stage of the new gear in the second gearbox section is engaged.

3. The arrangement according to claim 1, wherein, on the appearance of a gear-change signal, operating pressure is applied to the engagement actuator of the friction clutch of the previous gear.

4. The arrangement according to claim 3, wherein the operating pressure of the engagement actuator of the friction clutch of the previous gear is raised to a load pressure value sufficient for transmitting the instantaneous load torque.

5. The arrangement according to claim 4, wherein the increase of the operating pressure to the load pressure value in the engagement actuator of the friction clutch of the previous gear takes place, at the latest, on the engagement of the gearwheel clutch of the loose wheel of the gearwheel stage of the new gear in the second gearbox section.

6. The arrangement according to claim 5, wherein, after reaching the load pressure value of the operating pressure in the engagement actuator of the friction clutch of the previous gear, the disengagement actuator of the previous gear friction clutch is subjected to operating pressure up to the level of a disengagement pressure value sufficient to overcome the at least one engagement spring thereof.

7. The arrangement according to claim 6, wherein, after the load pressure value of the operating pressure in the engagement actuator of the friction clutch of the previous gear is reached, operating pressure is applied to the engagement actuator of the friction clutch of the new gear.

8. The arrangement according to claim 7, wherein, on an increase of the operating pressure in the engagement actuator of the friction clutch of the new gear above a constant contact pressure value, an intersection control of the operating pressures, takes place in the engagement actuators of the friction clutches of the previous gear and the new gear.

9. The arrangement according to claim 8, wherein, when the operating pressure in the engagement actuator of the friction clutch of the previous gear tends to zero, a control phase is initiated during which the operating pressure in the engagement actuator of the friction clutch of the new gear is raised to an essentially constant phase pressure value which is larger than the load pressure value of this operating pressure sufficient for transmitting an instantaneous load torque.

10. The arrangement according to claim 9, wherein, on reaching a load pressure value of the operating pressure in the engagement actuator of the friction clutch of the new gear sufficient for transmitting an instantaneous load torque, the gearwheel clutch of the gearwheel stage of the previous gear is disengaged.

11. The arrangement according to claim 10, wherein, after the disengagement of the gearwheel clutch of the gearwheel stage of the previous gear, the operating pressure of the disengagement actuator of the friction clutch of the previous gear is switched off.

12. The arrangement according to claim 11, wherein the control phase with increased phase pressure value of the operating pressure in the engagement actuator of the friction clutch of the new gear is terminated when the rotational speed of the input shaft has dropped to a rotational speed value dependent on the new gear.

13. The arrangement according to claim 12, wherein the operating pressure in the engagement actuator of the friction clutch of the new gear at an end of the control phase with increased phase pressure value is lowered to a load pressure value sufficient for transmitting an instantaneous load torque.

14. The arrangement according to claim 13, wherein, after the load pressure value of the operating pressure in the engagement actuator of the friction clutch of the new gear has been reached, the operating pressure in the disengagement actuator of the friction clutch of the new gear is switched off.

15. The arrangement according to claim 14, wherein, when the operating pressure in the disengagement actuator of the friction clutch of the new gear tends to zero, the operating pressure in the engagement actuator of the new gear friction clutch is also switch off.

16. The arrangement according to claim 15, wherein the disengagement actuator of the friction clutch of the previous gear and the engagement actuator of the friction clutch of the new gear are simultaneously subjected to operating pressure.

17. The arrangement according to claim 16, wherein the operating pressure in the disengagement actuator of the friction clutch of the previous gear and the operating pressure in the engagement actuator of the friction clutch of the new gear are simultaneously switched off.

18. The arrangement according to claim 17, wherein the engagement actuator of the friction clutch of the previous gear and the disengagement actuator of the friction clutch of the new gear are simultaneously subjected to operating pressure.

19. The arrangement according to claim 1, wherein each clutch comprises friction discs being only axially movable and engageable for synchronous operation during gear change by the at least one engagement spring and disengageable by the disengagement actuator comprising an axial piston type pressure medium disengagement actuator sized and configured to overcome the at least one engagement spring, and an axial piston type pressure medium engagement actuator arranged to be brought into cooperation with the friction discs in an engagement direction, wherein the at least one engagement spring is arranged also to be disconnected by the disengagement actuator when the friction discs are actuated in the engagement direction by the engagement actuator.

20. The arrangement according to claim 1, wherein the friction discs are only axially movable and engageable by at least one engagement spring and disengageable by an axial piston type pressure medium disengagement actuator sized and configured to overcome the at least one engagement spring, an axial piston type pressure medium engagement actuator is arranged to be brought into cooperation with the friction discs in an engagement direction, and the at least one engagement spring is arranged also to be disconnected by the disengagement actuator when the friction discs are actuated in the engagement direction by the engagement actuator.

21. The arrangement according to claim 1, wherein both engagement actuator and the at least one engagement spring are located relative to a direction of clutch centerline on a side of a friction disc group containing the friction discs.

22. The arrangement according to claim 1, wherein the at least one engagement spring is a plate spring.

23. The arrangement according to claim 1, wherein the engagement actuator operates on the friction discs via a pressure piece which is configured and arranged to be structurally independent of the at least one engagement spring.

24. The arrangement according to claim 1, wherein the engagement actuator is located on one clutch half, and an associated pressure piece operates on one of the friction discs rotationally connected to the clutch half.

25. The arrangement according to claim 24, wherein a cylindrical hole is provided in the engagement actuator for an axial piston, and a clutch housing is solidly connected with the outer plate carrier.

26. The arrangement according to claim 25, wherein the disengagement actuator and an abutment solidly connected to the clutch housing for supporting a radially central region of the at least one engagement spring are located on different sides of the at least one engagement spring, and the disengagement actuator operates on a radially inner region of the at least one engagement spring.

27. The arrangement according to claim 1, wherein the engagement actuator is located on a clutch half solidly connected to an outer plate carrier.

28. The arrangement according to claim 27, wherein the at least one engagement spring has an outer radius which is less than a distance between the cylindrical hole and the clutch centerline.

29. The arrangement according to claim 28, wherein the pressure piece of the engagement actuator penetrates with clearance through aligned openings in the at least one engagement spring.

30. The arrangement according to claim 29, wherein the pressure piece of the engagement actuator penetrates with clearance through aligned openings in the common pressure piece of the engagement spring and the disengagement actuator.

31. The arrangement according to claim 30, wherein a cylindrical hole is provided in the engagement actuator for an axial piston of the pressure medium disengagement actuator and is solidly connected to the common pressure piece.

32. The arrangement according to claim 1, wherein the engagement actuator is located on a non-rotating casing, and an associated pressure piece is divided by a thrust bearing.

33. The arrangement according to claim 32, wherein the at least one engagement spring and the disengagement actuator operate on a common pressure piece.

34. The arrangement according to claim 1, wherein the at least one engagement spring and the disengagement actuator operate on a common pressure piece, and the engagement actuator is located in a series power transmission path between the at least one engagement spring and the friction disc.

35. The arrangement according to claim 34, wherein the common pressure piece has a hole opening in a direction of the friction discs for a pressure piece of the engagement actuator.

36. A method for engaging and disengaging friction clutches arranged in series with a gearbox section having at least one gearwheel stage with a loose wheel which can be connected to a shaft thereof by a gearwheel clutch, which friction clutches are arranged in a power transmission path between an input shaft and an output shaft of a multi-path gearwheel change-speed gearbox, during a gear change between a previous gear and a new gear where, in the previous gear, a first gearbox section having a gearwheel stage is connected by engagement of both one of its gearwheel clutches and an associated friction clutch having at least one engagement spring and a disengagement actuator and, in the new gear, a second gearbox section having a gearwheel stage is connected in a corresponding manner into a drive connection between the input shaft and the output shaft, comprising the steps of subjecting, on the appearance of a gear change signal, a disengagement actuator of a friction clutch of the new gear to operating pressure at least up to the level of a disengagement pressure value sufficient to overcome at least one engagement spring holding the friction clutch of the near gear; engaging, on or after reaching the disengagement pressure value, a gearwheel clutch of a loose wheel of the gearwheel stage of the new gear in the second gearbox section; applying, on the appearance of a second gearchange signal, an operating pressure to an engagement actuator of the friction clutch of the previous gear; raising the operating pressure of the engagement actuator of the friction clutch of the previous gear to a load pressure value sufficient for transmitting an instantaneous load torque so as to take place, at the latest, on engagement of the gearwheel clutch of the loose wheel of the gearbox stage of the new gear in the second gearbox section; subjecting, after reaching the load pressure value of the operating pressure in the engagement actuator of the friction clutch of the previous gear, the disengagement actuator of the previous gear friction clutch to operating pressure up to the level of a disengagement pressure value sufficient to overcome the at least one engagement spring thereof; applying, after the load pressure value of the operating pressure in the engagement actuator of the friction clutch of the previous gear is reached, operating pressure to an engagement actuator of the friction clutch of the new gear; providing, on an increase of the operating pressure in the engagement actuator of the friction clutch of the new gear above a constant contact pressure value, an intersection control of the operating pressures, in the engagement actuators, of the friction clutches of the previous gear and the new gear; initiating, when the operating pressure in the engagement actuator of the friction clutch of the previous gear tends to zero, a control phase during which the operating pressure in the engagement actuator of the friction clutch of the new gear is raised to an essentially constant phase pressure value which is larger than the load pressure value of this operating pressure sufficient for transmitting an instantaneous load torque; disengaging, on reaching a load pressure value of the operating pressure in the engagement actuator of the friction clutch of the new gear sufficient for transmitting an instantaneous load torque, the gearwheel clutch of the gearwheel stage of the previous gear; switching off, after the disengagement of the gearwheel clutch of the gearwheel stage of the previous gear, the operating pressure of the disengagement actuator of the friction clutch of the previous gear; terminating the control phase with increased phase pressure value of the operating pressure in the engagement actuator of the friction clutch of the new gear when the rotational speed of the input shaft has dropped to a rotational speed value dependent on the new gear; lowering the operating pressure in the engagement actuator of the friction clutch of the new gear at an end of the control phase with increased phase pressure value to a load pressure value sufficient for transmitting an instantaneous load torque; switching off, after the load pressure value of the operating pressure in the engagement actuator of the friction clutch of the new gear has been reached, the operating pressure in the disengagement actuator of the friction clutch of the new gear; also switching off, when the operating pressure in the disengagement actuator of the friction clutch of the new gear tends to zero, the operating pressure in the engagement actuator of the new gear friction clutch; simultaneously subjecting the disengagement actuator of the friction clutch of the previous gear and the engagement actuator of the friction clutch of the new gear to operating pressure; simultaneously switching off the operating pressure in the disengagement actuator of the friction clutch of the previous gear and the operating pressure in the engagement actuator of the friction clutch of the new gear; and also simultaneously subjecting the engagement actuator of the friction clutch of the previous gear and the disengagement actuator of the friction clutch of the new gear to operating pressure.

* * * * *